US009780713B2

(12) United States Patent
Tsukakoshi et al.

(10) Patent No.: US 9,780,713 B2
(45) Date of Patent: Oct. 3, 2017

(54) DRIVING APPARATUS FOR ELECTRIC MOTOR

(71) Applicant: EBARA CORPORATION, Tokyo (JP)

(72) Inventors: Kenta Tsukakoshi, Tokyo (JP); Masakazu Komai, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 15/123,488

(22) PCT Filed: Mar. 11, 2015

(86) PCT No.: PCT/JP2015/057089
§ 371 (c)(1),
(2) Date: Sep. 2, 2016

(87) PCT Pub. No.: WO2015/137372
PCT Pub. Date: Sep. 17, 2015

(65) Prior Publication Data
US 2017/0070171 A1    Mar. 9, 2017

(30) Foreign Application Priority Data

Mar. 11, 2014   (JP) ................................. 2014-048147

(51) Int. Cl.
*H02P 21/00*  (2016.01)
*H02P 6/18*   (2016.01)
(Continued)

(52) U.S. Cl.
CPC ............... *H02P 21/24* (2016.02); *H02P 6/18* (2013.01); *H02P 21/00* (2013.01); *H02P 27/08* (2013.01)

(58) Field of Classification Search
CPC .......... H02P 21/00; H02P 21/24; H02P 27/08; H02P 6/18
(Continued)

(56) References Cited

U.S. PATENT DOCUMENTS 9,634,602 B2 *   4/2017   Hou ........................ H02M 1/12
2001/0017239 A1 *  8/2001   Tajima ..................... B66B 1/30
187/290
(Continued)

FOREIGN PATENT DOCUMENTS

| JP | 2012-050285 A | 3/2012 |
| JP | 2014-131398 A | 7/2014 |
| WO | 2012/029715 A1 | 3/2012 |

OTHER PUBLICATIONS

English translation of International Search Report issued in Application No. PCT/JP2015/051089 dated Jun. 9, 2015.

*Primary Examiner* — Bentsu Ro
*Assistant Examiner* — Said Bouziane
(74) *Attorney, Agent, or Firm* — Pearne & Gordon LLP

(57) ABSTRACT

A driving apparatus for driving an electric motor, such as a synchronous motor or an induction motor, and more particularly to a driving apparatus which performs a vector control based on an output current of an inverter. The driving apparatus of the present invention includes an inverter, a current detector configured to detect an output current of the inverter, and a vector controller configured to transform the output current, detected by the current detector, into a torque current and a magnetization current and to control the torque current and the magnetization current. The vector controller includes a target-output-voltage determination section configured to determine a target output voltage from the torque current, the magnetization current, an angular velocity of the rotor, and motor constants, and a target-magnetization-current determination section configured to determine a magnetization-current command value based on a deviation between the torque-voltage command value and the target output voltage.

6 Claims, 11 Drawing Sheets

(51) Int. Cl.
*H02P 27/08* (2006.01)
*H02P 21/24* (2016.01)
(58) Field of Classification Search
USPC .............................................. 318/1
See application file for complete search history.

(56) References Cited

U.S. PATENT DOCUMENTS

2001/0017242 A1* 8/2001 Tajima ..................... B66B 1/30
                                                    187/296
2010/0060211 A1* 3/2010 Hashimoto ............ H02P 21/22
                                                    318/400.02
2014/0035495 A1* 2/2014 Kim ..................... H02P 27/085
                                                    318/400.17

* cited by examiner

DRIVING APPARATUS FOR ELECTRIC MOTOR

TECHNICAL FIELD

The present invention relates to a driving apparatus for driving an electric motor, such as a synchronous motor or an induction motor, and more particularly to a driving apparatus which performs a vector control based on an output current of an inverter.

BACKGROUND ART

Commonly-used conventional methods for controlling a motor include a V/F control which involves outputting a voltage corresponding to a command frequency, thereby keeping a motor magnetic flux constant, and a vector control which involves decomposing an inverter output current into an excitation current and a torque current, and controlling the excitation voltage and the torque voltage so as to generate a motor current which is commensurate with a load.

The V/F control does not require a high-speed computation and can control a motor with a simple construction. However, the V/F control is poor in feedback information, and therefore high-efficiency control adapted for characteristics of each individual motor cannot be expected. Furthermore, since the V/F control does not detect a position of a motor rotor, a rotor of a synchronous motor can lose synchronism.

A sensorless vector control is a control technique which can prevent a synchronous motor from losing synchronism and can control the synchronous motor without using an expensive position sensor. FIG. 12 shows a control block diagram illustrating the sensorless vector control. Three-phase currents Iu, Iv, Iw, detected by a current detector 12, are sent to a three-to-two phase transformation section 17, where the three-phase currents Iu, Iv, Iw on a stationary coordinate system are transformed into two-phase currents on the stationary coordinate system. The two-phase currents on the stationary coordinate system are sent to a stationary-to-rotational coordinate transformation section 18, where the two-phase currents are transformed, based on a phase θ, into two-phase currents on a rotating coordinate system, i.e., a magnetization current Im and a torque current It.

The torque current It and the magnetization current Im are sent to a torque-voltage control section 21 and a magnetization-voltage control section 22, respectively. A torque-current command value It is inputted from a target-torque-current determination section 24 into the torque-voltage control section 21. The torque-voltage control section 21 performs a PI calculation such that a deviation between the torque-current command value It* and a present torque current It becomes 0, thereby determining a torque-voltage command value Vt*. The target-torque-current determination section 24 is a velocity controller, and performs a PI calculation to determine the torque-current command value It* which is such that a deviation between an angular-velocity command value ω*, inputted from an outside of a vector controller 11, and a present angular velocity ω of a motor M becomes zero.

A magnetization-current command value Im* is inputted from a target-magnetization-current determination section 26 into the magnetization-voltage control section 22. The magnetization-voltage control section 22 performs a PI calculation such that a deviation between the magnetization-current command value Im* and the present magnetization current Im becomes 0, thereby determining a magnetization-voltage command value Vm*. A target-magnetization-current determination section 26 determines, by a PI calculation, a magnetization-current command value Im* which is such that a deviation between a target output voltage Vout*, which is sent from a target-output-voltage determination section 27, and a calculated value Vout of the present output voltage becomes zero.

The present output voltage Vout of an inverter 10 is determined by an output voltage calculator 30 from the torque-voltage command value Vt* and the magnetization-voltage command value Vm*. The torque-voltage command value Vt* and the magnetization-voltage command value Vm* are sent to a velocity calculator 31, where the present angular velocity ω of a rotor is determined. This angular velocity ω is inputted into the target-torque-current determination section 24, the target-output-voltage determination section 27, and an integrator 33. The integrator 33 integrates the angular velocity ω to determine the phase θ of the rotor. The phase θ is inputted into the stationary-to-rotational coordinate transformation section 18 and a rotational-to-stationary coordinate transformation section 35.

The magnetization-voltage command value Vm* and the torque-voltage command value Vt* are inputted into the rotational-to-stationary coordinate transformation section 35, where the magnetization-voltage command value Vm* and the torque-voltage command value Vt* on a rotating coordinate system are transformed, based on the phase θ, into a torque-voltage command value and a magnetization-voltage command value on a stationary coordinate system. Further, the torque-voltage command value and the magnetization-voltage command value on the stationary coordinate system are transformed by a two-to-three phase transformation section 36 into voltage command values Vu*, Vv*, Vw* of three phases (i.e., u-phase, v-phase, w-phase). As described above, the inverter 10 generates a voltage in accordance with the voltage command values Vu*, Vv*, Vw*.

The sensorless vector control illustrated in FIG. 12 is a control method which estimates a position of a rotor from a feedback motor current, without using a position sensor.

However, in the sensorless vector control, the output voltage is determined based on a rotational speed (or rotational frequency) of a motor, irrespective of a magnitude of a load on the motor. As a result, an operation efficiency of the motor is lowered in a low-load speed range, while the motor rotor can lose synchronism in a high-load speed range, making it difficult to achieve a stable control.

CITATION LIST

Patent Literature

Patent document 1: Japanese laid-open patent publication No. 2012-50285

SUMMARY OF INVENTION

Technical Problem

The present invention has been made in view of the problem. It is therefore an object of the present invention to provide a driving apparatus for an electric motor which can effectively drive the motor even when a load on the motor varies.

Solution to Problem

In one aspect of the present invention, there is provided a driving apparatus for an electric motor, comprising: an inverter; a current detector configured to detect an output current of the inverter; and a vector controller configured to transform the output current, detected by the current detector, into a torque current and a magnetization current, and to control the torque current and the magnetization current, wherein the vector controller comprises: a three-to-two phase transformation section configured to transform three-phase currents, detected by the current detector, into two-phase currents; a stationary-to-rotational coordinate transformation section configured to transform the two-phase currents on a stationary coordinate system, which have been transformed by the three-to-two phase transformation section, into a torque current and a magnetization current on a rotating coordinate system; a torque-voltage control section configured to determine a torque-voltage command value based on a deviation between a torque-current command value and the torque current; a magnetization-voltage output section configured to output 0 as a magnetization-voltage command value; a rotational-to-stationary coordinate transformation section configured to transform the torque-voltage command value and the magnetization-voltage command value on a rotating coordinate system into a torque-voltage command value and a magnetization-voltage command value on a stationary coordinate system; a two-to-three phase transformation section configured to transform the torque-voltage command value and the magnetization-voltage command value, which have been transformed by the rotational-to-stationary coordinate transformation section, into three-phase voltage command values; a velocity calculator configured to calculate an angular velocity of a rotor of the electric motor from the magnetization current, a magnetization-current command value, and the torque-voltage command value; a target-torque-current determination section configured to determine the torque-current command value based on a deviation between the angular velocity and an angular-velocity command value; a target-output-voltage determination section configured to determine a target output voltage from the torque current, the magnetization current, the angular velocity of the rotor, and motor constants; and a target-magnetization-current determination section configured to determine the magnetization-current command value based on a deviation between the torque-voltage command value and the target output voltage.

In a preferred aspect of the present invention, the motor constants are a magnetic flux of the electric motor, a winding resistance of the electric motor, and an inductance in a q-axis direction which is perpendicular to the magnetic flux generated by a permanent magnet of the rotor.

In a preferred aspect of the present invention, the magnetization-current command value is adjusted so as to keep the target output voltage at a rated voltage of the motor after an output voltage, generated by the inverter, has reached the rated voltage of the motor.

In a preferred aspect of the present invention, the magnetization-current command value is adjusted so as to keep the target output voltage at not more than an upper limit of an output voltage of the inverter, after the target output voltage has reached the upper limit of the output voltage generated by the inverter.

In a preferred aspect of the present invention, the target output voltage is kept at one of a rated voltage of the motor and an upper limit of an output voltage generated by the inverter, whichever the target output voltage reaches first, after the target output voltage has reached either the rated voltage of the motor or the upper limit of the output voltage generated by the inverter.

In another aspect of the present invention, there is provided a driving apparatus for an electric motor, comprising: an inverter; a current detector configured to detect an output current of the inverter; and a vector controller configured to transform the output current, detected by the current detector, into a torque current and a magnetization current and to control the torque current and the magnetization current, wherein the vector controller comprises: a torque-voltage control section configured to determine a torque-voltage command value based on a deviation between a torque-current command value and the torque current; a target-output-voltage determination section configured to determine a target output voltage from the torque current, the magnetization current, an angular velocity of the rotor of the electric motor, and motor constants; and a target-magnetization-current determination section configured to determine a magnetization-current command value based on a deviation between the torque-voltage command value and the target output voltage.

Advantageous Effects of Invention

According to the present invention, the target-output-voltage determination section determines the target output voltage Vout* from the torque current It, the magnetization current Im, the angular velocity co of the rotor, and the motor constants. Since the torque current It and the magnetization current Im vary depending on the magnitude of the load on the motor, the target output voltage Vout* also varies depending on the magnitude of the load on the motor. Therefore, the driving apparatus can output an inverter output voltage which varies in response to the magnitude of the load on the motor. As a result, the motor can be effectively driven.

DESCRIPTION OF EMBODIMENTS

Embodiments of the present invention will now be described with reference to the drawings.

Figure 1:
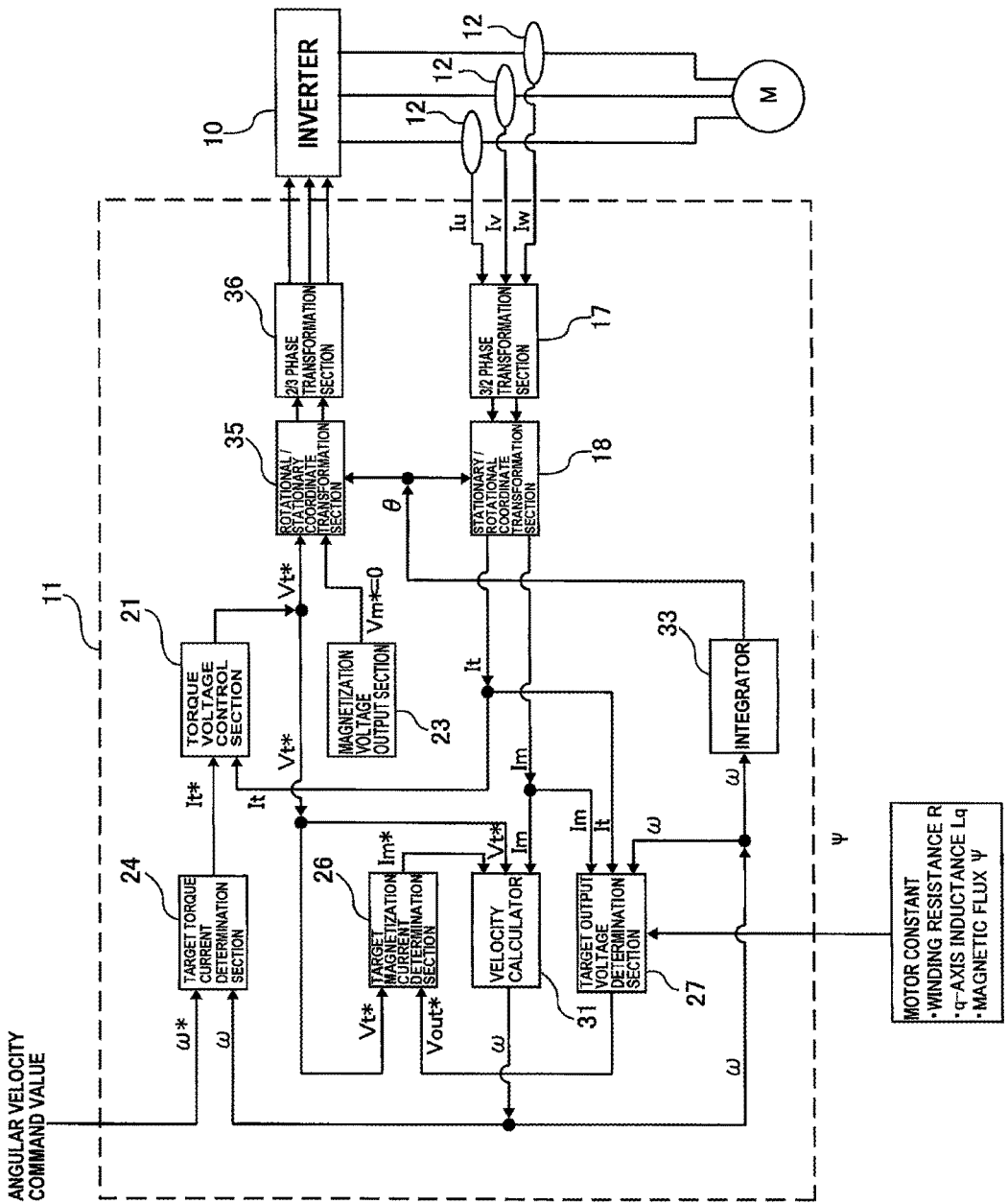
FIG. 1 is a block diagram showing a driving apparatus according to an embodiment of the present invention.

FIG. 1 is a block diagram showing a driving apparatus according to an embodiment of the present invention. This driving apparatus is an inverter device (or power conversion device) for driving a motor M. As shown in FIG. 1, the driving apparatus is constituted by a plurality of elements including an inverter 10 and a vector controller 11. Specifically, the driving apparatus includes the inverter 10 for generating a voltage to be supplied to the motor M, the vector controller 11 for determining a voltage command value for the inverter 10, and a current detector (or an ammeter) 12 for detecting an electric current supplied from the inverter 10 to the motor M.

Figure 2:
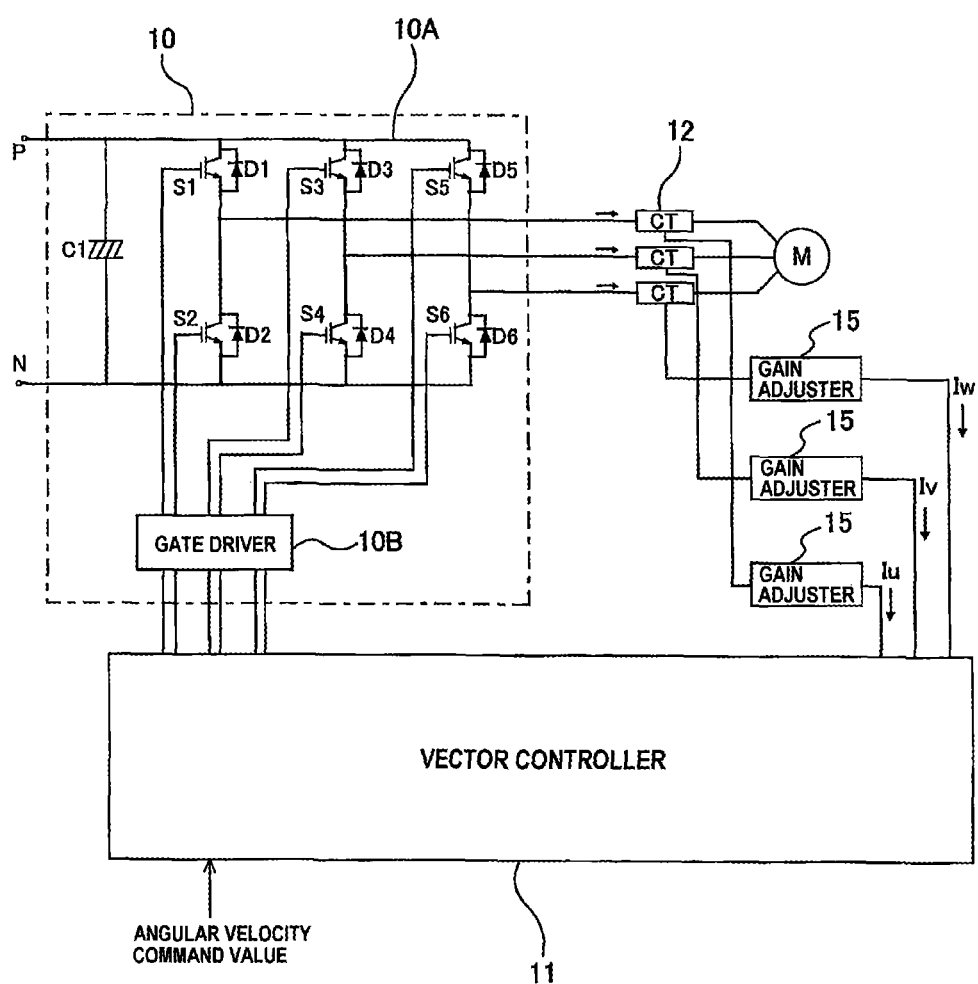
FIG. 2 is a schematic diagram showing a detail of an inverter shown in FIG. 1.

FIG. 2 is a schematic diagram showing a detail of the inverter 10 shown in FIG. 1. The inverter 10 is basically constituted by an inverter circuit 10A as a power converter, and a gate driver 10B for driving the inverter circuit 10A. In the inverter circuit 10A, three pairs of upper and lower arms are connected in parallel between a positive line P and a negative line N. DC power (e.g., DC power from a DC power source obtained by full-wave rectification of a commercial power source) is supplied to the positive line P and the negative line N. An antiparallel circuit, composed of switching elements (IGBT) S1 to S6 and diodes D1 to D6, is incorporated in the upper and lower arms of each phase. A symbol C1 represents a capacitor. The inverter circuit 10A is composed of the switching elements S1 to S6, the diodes D1 to D6, and the capacitor C1. The gate driver 10B is configured to drive the switching elements S1 to S6 of the inverter circuit 10A so as to generate a voltage in accordance with the voltage command value sent from the vector controller 11.

The current detector 12 measures three-phase currents Iu, Iv, Iw supplied from the inverter 10 to the motor M. The measured values of the three-phase currents are amplified by a gain adjuster 15, and are then inputted into the vector controller 11. The gain adjuster 15 may be omitted. Measuring of the three-phase currents Iu, Iv, Iw may comprise firstly measuring the currents of any two phases, and then determining the remaining current from an equation: Iu+Iv+Iw=0. The vector controller 11 generates three-phase voltage command values Vu*, Vv*, Vw*, based on the three-phase currents Iu, Iv, Iw and an angular-velocity command value inputted from the outside. Further, the vector controller 11 generates PWM signals corresponding to the three-phase voltage command values Vu*, Vv*, Vw*, and sends the PWM signals to the gate driver 10B. The gate driver 10B generates gate-drive PWM signals based on the PWM signals corresponding to the three-phase voltage command values Vu*, Vv*, Vw*. The six switching elements S1 to S6 are operated (on/off) based on the gate drive-PWM signals. The inverter 10 thus generates a voltage based on the three-phase voltage command values from the vector controller 11, and applies the voltage to the motor M.

A basic operation of the vector controller 11 is as follows. The three-phase output currents of the inverter 10, detected by the current detector 12, are transformed into two-phase currents (vectors) on a rotating coordinate system. When one axis of the rotating coordinate system coincides with a direction of a magnetic flux of a magnet of the motor M, the other axis is perpendicular to the magnetic flux of the magnet of the motor M. Therefore, controlling of the current vector on the axis perpendicular to the magnetic flux of the magnet of the motor M can achieve controlling of the torque of the motor M. Specifically, PI control is performed to determine two-phase voltage command values that can eliminate a deviation between the transformed two-phase currents values and their corresponding target values. The determined two-phase voltage command values on the rotating coordinate system are transformed into three-phase voltage command values on a stationary coordinate system. Then, the PWM signals, corresponding to the voltage command values of the respective phases, are generated, and the PWM signals are sent to the gate driver 10B of the inverter 10. The vector controller 11 may be comprised of a CPU (central processing unit) or a dedicated processing device.

The vector controller 11 will now be described in detail with reference to FIG. 1. The three-phase currents Iu, Iv, Iw, detected by the current detector 12, are sent to a three-to-two phase transformation section 17, where the three-phase currents Iu, Iv, Iw on a stationary coordinate system are transformed into two-phase currents on the stationary coordinate system. The two-phase currents on the stationary coordinate system are sent to a stationary-to-rotational coordinate transformation section 18, where the two-phase currents are transformed, based on a phase θ, into two-phase currents on a rotating coordinate system, i.e., a magnetization current Im and a torque current It.

The torque current It and the magnetization current Im are sent to a torque-voltage control section 21 and a velocity calculator 31, respectively. A torque-current command value It* is inputted from a target-torque-current determination section 24 into the torque-voltage control section 21. The torque-voltage control section 21 performs a PI calculation so that a deviation between the torque-current command value It* and the present torque current It becomes 0, thereby determining a torque-voltage command value Vt*. The target-torque-current determination section 24 is a velocity controller, and performs a PI calculation to determine the torque-current command value It* which can eliminate a deviation between an angular-velocity command value ω*, inputted from the outside of the vector controller 11, and the present angular velocity ω of the motor M.

A target-magnetization-current determination section 26 is configured to determine, by a PI calculation, a magnetization-current command value Im* which can eliminate a deviation between a target output voltage Vout* and the present output voltage Vout (=Vt*). The target output voltage Vout* is sent from a target-output-voltage determination section 27 (which will be described later in detail).

The magnetization-current command value Im* is inputted from the target-magnetization-current determination section 26 into the velocity calculator 31. A phase synchronizing circuit (or phase-locked loop) may be used as the velocity calculator 31. The velocity calculator 31 performs a PI calculation so as to eliminate a deviation between the magnetization-current command value Im* and the present magnetization current Im, and performs signal processing with the torque-voltage command value Vt* to determine the present angular velocity ω of a rotor. This angular velocity ω is inputted into the target-torque-current determination section 24, the target-output-voltage determination section 27, and an integrator 33. The integrator 33 integrates the angular velocity ω to determine the phase θ of the rotor. The phase θ is inputted into the stationary-to-rotational coordinate transformation section 18 and a rotational-to-stationary coordinate transformation section 35.

The torque-voltage control section 21 and a magnetization-voltage output section 23 are coupled to the rotational-to-stationary coordinate transformation section 35. The magnetization-voltage output section 23 outputs 0 as a magnetization-voltage command value Vm* to the rotational-to-stationary coordinate transformation section 35. This magnetization-voltage output section 23 is not a PI control unit, and is configured to simply output 0 as the magnetization-voltage command value Vm*.

The magnetization-voltage command value Vm* and the torque-voltage command value Vt* are inputted into the rotational-to-stationary coordinate transformation section 35, where the magnetization-voltage command value Vm* and the torque-voltage command value Vt* on a rotating coordinate system are transformed, based on the phase θ, into a torque-voltage command value and a magnetization-voltage command value on a stationary coordinate system. Further, the torque-voltage command value and the magnetization-voltage command value on the stationary coordinate system are transformed by a two-to-three phase transformation section 36 into voltage command values Vu*, Vv*, Vw* of three phases (u-phase, v-phase, w-phase). As described above, the inverter 10 generates a voltage in accordance with the voltage command values Vu*, Vv*, Vw*.

Figure 3A:
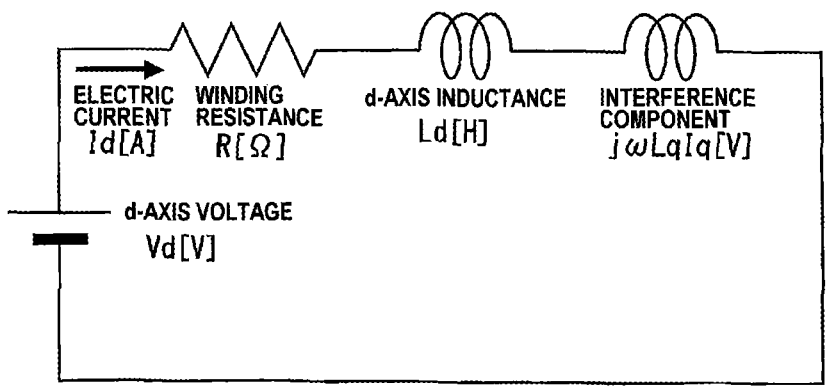
FIG. 3A is a diagram showing an equivalent circuit of a synchronous motor.
Figure 3B:
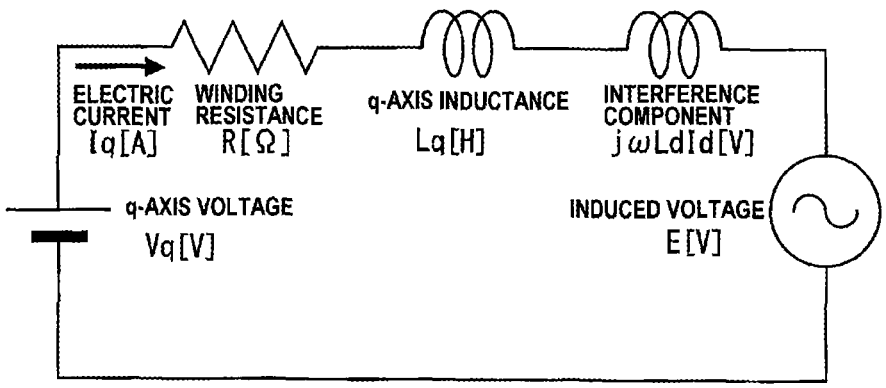
FIG. 3B is a diagram showing an equivalent circuit of a synchronous motor.

A description will now be given of a case in which the vector controller 11 controls a permanent magnet-type synchronous motor. When a d-axis coincides with a direction of a magnetic flux generated by a permanent magnet of a rotor, and a q-axis is perpendicular to the d-axis in a dq rotating coordinate system, an equivalent circuit of the synchronous motor can be given as shown in FIGS. 3A and 3B. In FIGS. 3A and 3B, R represents a winding resistance, Ld represents an inductance in a d-axis direction, Lq represents an inductance in a q-axis direction, ω represents an angular velocity, and E represents an induced voltage.

FIG. 3A shows the equivalent circuit when an electric current Id flows in the d-axis direction, and FIG. 3B shows the equivalent circuit when an electric current Iq flows in the q-axis direction. Referring to FIGS. 3A and 3B, voltage equations are expressed as follows:

$$Vd = Id \cdot R + pLdId - \omega LqIq \quad (1)$$

$$Vq = Iq \cdot R + pLqIq + \omega LdId + E \quad (2)$$

where p represents a temporal differentiation (d/dt). A symbol j shown in FIGS. 3A and 3B represents an imaginary unit. When the interference components jωLqIq and jωLdId are expressed on the dq-axes (motor axes), the vector direction is changed and the symbol j comes off; therefore, the symbol j does not appear in the equations (1) and (2). In the equations (1) and (2), the induced voltage E is the product of the angular velocity ω and a magnetic flux Ψ generated by the permanent magnet.

Figure 4:
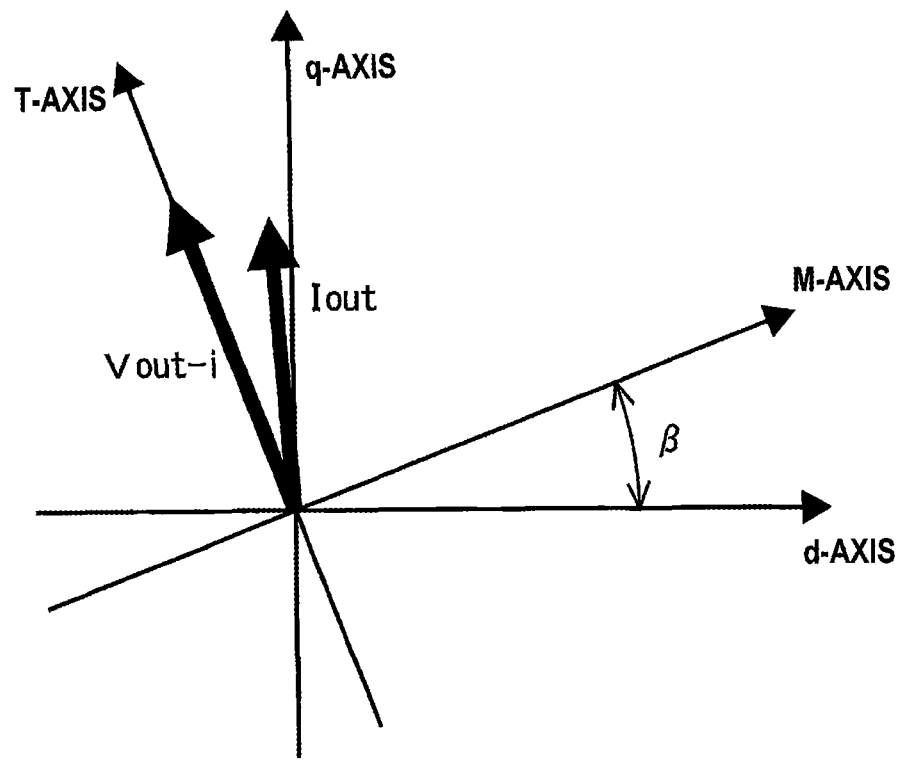
FIG. 4 is a diagram showing an output current Iout and an output voltage Vout of the inverter, each of which is expressed as a vector.

Because of the inductance components (L), a phase lag occurs in the output voltage Vout of the inverter 10 with respect to the output current Iout of the inverter 10. FIG. 4 is a diagram showing the output current Iout and the output voltage Vout of the inverter 10, each expressed as a vector. In FIG. 4, a T-axis is an axis that coincides with a phase of an output voltage Vout-i when the motor is in an ideal control state, and an M-axis is an axis perpendicular to the T-axis. A phase difference β exists between the MT-axes and the dq-axes. In this embodiment, the vector control of the motor is performed using a voltage Vt and a current It on the T-axis and a voltage Vm and a current Im on the M-axis. The MT-axes are axes for use in controlling of the inverter 10, and are therefore herein called inverter axes.

In this embodiment, the T-axis is used as a reference axis, and therefore the voltage component Vm* of the M-axis is made 0. A voltage Vt is applied to the T-axis and a voltage Vm is applied to the M-axis, and the control is performed such that the output current Iout coincides with the q-axis.

Figure 5:
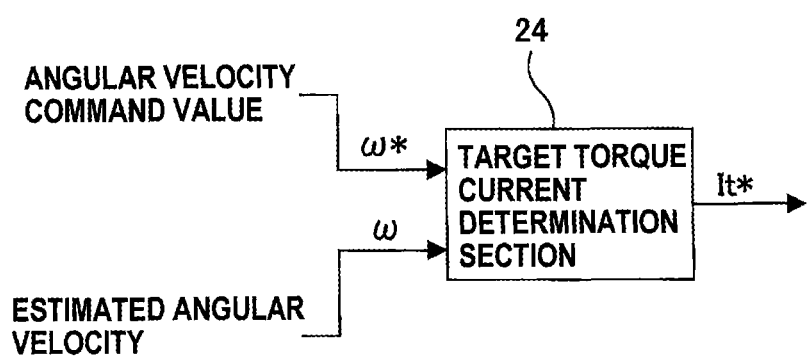
FIG. 5 is a diagram showing a control block which determines a target value of a torque current.

FIG. 5 shows a control block which determines a target value of the torque current It. A target value of the torque current, i.e., a torque-current command value It*, is generated by the target-torque-current determination section 24. An angular-velocity command value ω* and the present angular velocity ω are inputted into the target-torque-current determination section 24, which determines the torque-current command value It* for eliminating a deviation between these two values ω* and ω. The angular-velocity command value ω* is a desired angular velocity required for the motor M, and is inputted from the outside of the vector controller 11 into the target-torque-current determination section 24. The present angular velocity ω is given by the velocity calculator 31. The velocity calculator 31 performs a PI calculation so as to eliminate the deviation between the value Im*, determined by the target-magnetization-current determination section 26, and the present magnetization current Im. Further, the velocity calculator 31 determines an estimated angular velocity by processing a signal of the torque-voltage command value Vt*. This estimated angular velocity is used as the present angular velocity ω.

If the angular-velocity command value ω* is larger than the present angular velocity ω (i.e., if ω*>ω), the target-torque-current determination section 24 outputs a larger torque-current command value It* so as to increase the torque and the velocity. In contrast, if the angular-velocity command value ω* is lower than the current angular velocity ω (i.e., if ω*<ω), the target-torque-current determination section 24 outputs a smaller torque-current command value It* so as to decrease the torque and the velocity.

Figure 6A:
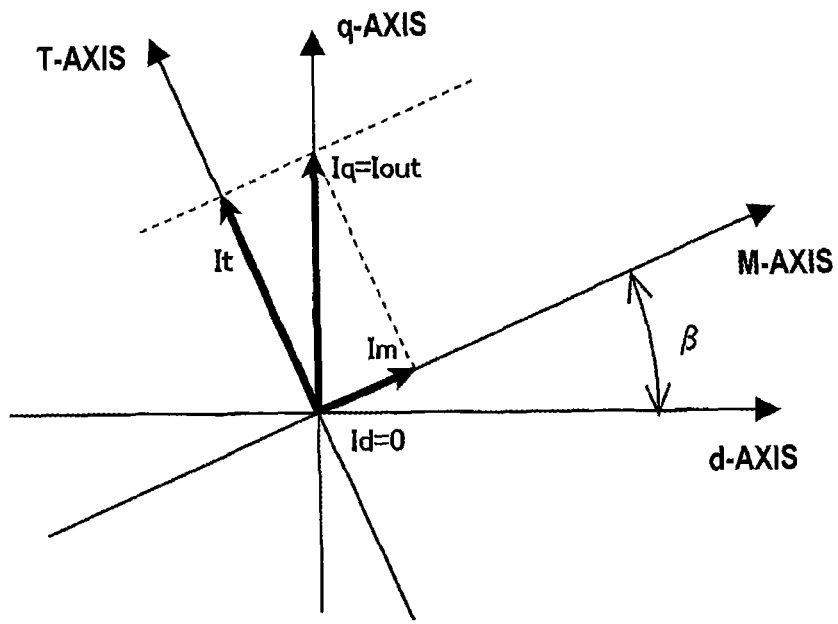
FIG. 6A is a diagram showing a relationship between current vector on dq-axes and current vector on MT-axes at a maximum operating efficiency.

A process of determining the magnetization-current command value Im*, which is a target value of the magnetization current Im, will now be described. For ease of descriptions, in the following embodiment, an SPM (Surface Permanent Magnet) motor is used as the synchronous motor. In the SPM motor, the highest operating efficiency is achieved when the output current Iout from the inverter 10 flows perpendicularly to the d-axis. It is therefore desirable to control the output current of the inverter 10 such that the current Id on the d-axis becomes 0. FIG. 6A shows a relationship between current vector on the dq-axes and current vector on the MT-axes when the highest motor operating efficiency is achieved.

The output voltage Vout of the inverter 10 can be determined from the equations (1) and (2) as follows:

$$Vout(\rightarrow) = Vd(\rightarrow) + Vq(\rightarrow) \quad (3)$$

$$Vout = \sqrt{\begin{array}{l}(Id \cdot R + pLdId - \omega LqIq)^2 + \\ (Iq \cdot R + pLqIq + \omega LdId + \omega \Psi)^2\end{array}} \quad (4)$$

where a symbol (→) represents a vector.

When the motor M is in a stable operation, the output current is in the form of a sine wave. During the stable operation, the coordinate-transformed currents It and Im change little and can be regarded as being in a steady state. Therefore, the differential term in the equation (4) is negligible. Accordingly, the equation (4) can be expressed as follows:

$$Vout = \sqrt{(Id \cdot R - \omega Lq Iq)^2 + (Iq \cdot R + \omega Ld Id + \omega \Psi)^2} \quad (5)$$

Since Id is zero (i.e., Id=0) in the state shown in FIG. 6A, Iq is equal to Iout (Iq=Iout). Therefore, the equation (5) can be expressed as follows:

$$Vout = \sqrt{(-\omega Lq \cdot Iout)^2 + (Iout \cdot R + \omega \Psi)^2} \quad (6)$$

Further, as shown in FIG. 6A, Iout is expressed using components on the MT-axes as $$Iout = \sqrt{Im^2 + It^2} \quad (7)$$

By substituting the equation (7) into the equation (6), the following equation is obtained.

$$Vout = \sqrt{(-\omega Lq \sqrt{Im^2 + It^2})^2 + (\sqrt{Im^2 + It^2} \cdot R + \omega \Psi)^2} \quad (8)$$

According to the above equation (8), the output voltage Vout can be calculated using the torque current It, the magnetization current Im, the angular velocity ω of the rotor, the winding resistance (i.e., motor resistance) R, the magnetic flux Ψ, and the q-axis inductance Lq. The winding resistance R, the magnetic flux Ψ, and the q-axis inductance Lq may be herein collectively called motor constants.

Figure 6B:
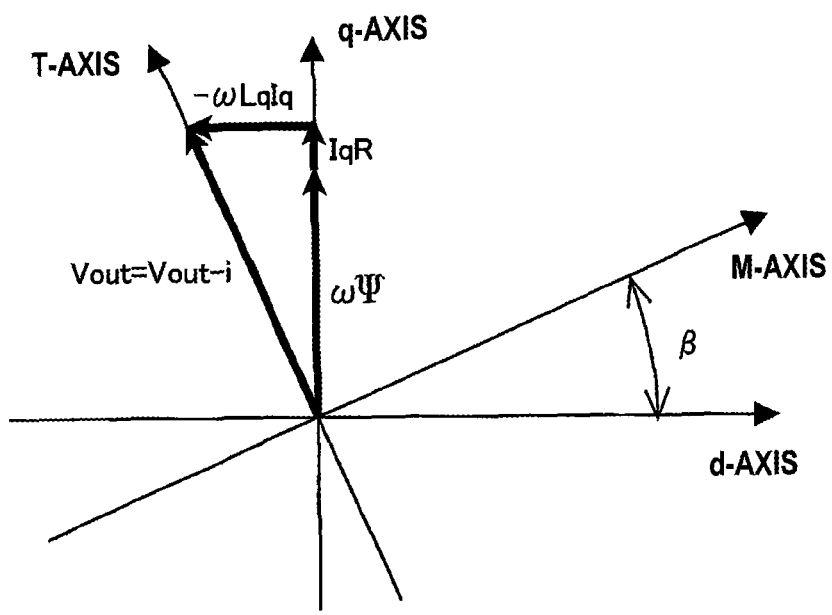
FIG. 6B is a diagram showing Vout as a vector corresponding to Iout shown in FIG. 6A.

FIG. 6B is a diagram showing Vout as a vector corresponding to Iout shown in FIG. 6A. Since FIG. 6A shows an ideal state when Id is 0, the output voltage at that time is referred to as an ideal output voltage Vout-i. The T-axis coincides with the direction of the vector of the ideal output voltage Vout-i.

Figure 7A:
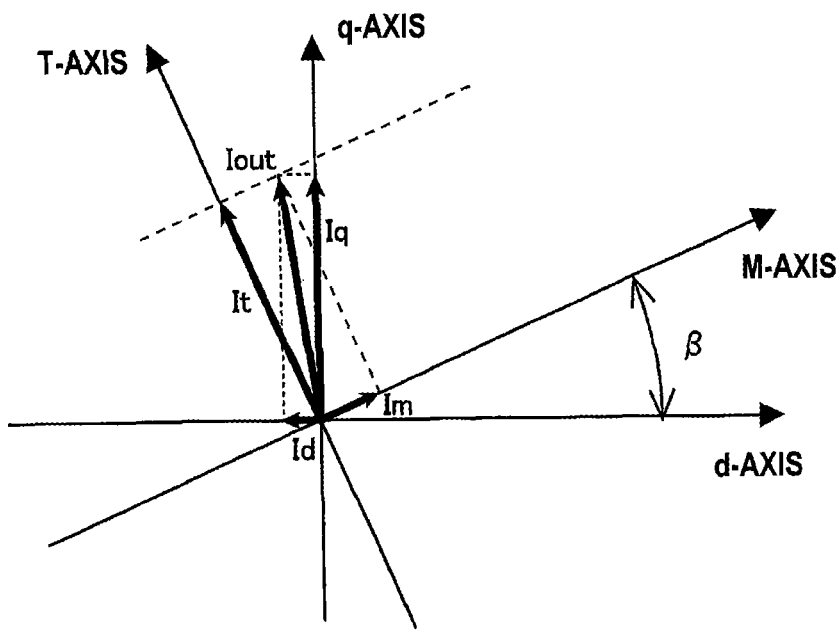
FIG. 7A is a diagram showing a relationship between current vectors Iout, Iq, It, Im when Id<0.
Figure 7B:
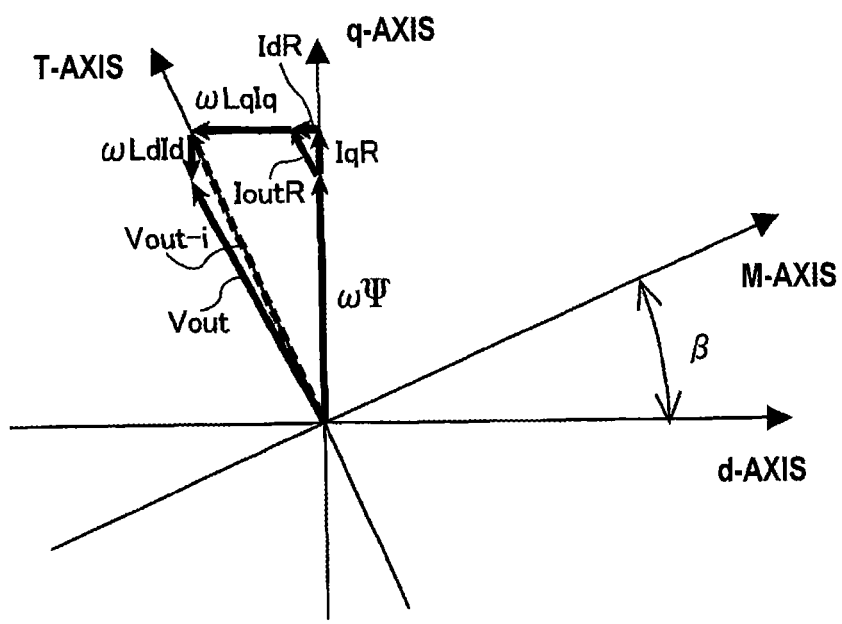
FIG. 7B is a diagram showing a voltage vector Vout corresponding to the current vector Iout shown in FIG. 7A.

FIG. 7A shows a relationship between Iout, Iq, Id, It, and Im in a case where a phase lead of the output current Iout occurs with respect to the current Iq, i.e., when Id<0. Under a condition that the torque current It is controlled at the same magnitude as that of FIG. 6A based on the torque-current command value It*, a tip of the vector Iout lies on a straight line, which is perpendicular to the T-axis and extends through a tip of the vector It. Accordingly, the vector Iq is smaller than that in the ideal state shown in FIG. 6A. The vector of the corresponding voltage Vout is as shown in FIG. 7B. Since Id is smaller than zero, i.e., Id<0, IdR is a leftward vector, and ωLdId is a downward vector. Because of the presence of these vectors and also because of the smaller Iq, the output voltage Vout is smaller than the ideal output voltage Vout-i shown by dotted line (see FIG. 6B). At this time, the current Im on the M-axis is smaller than the current Im in the ideal state shown in FIG. 6A.

Figure 8A:
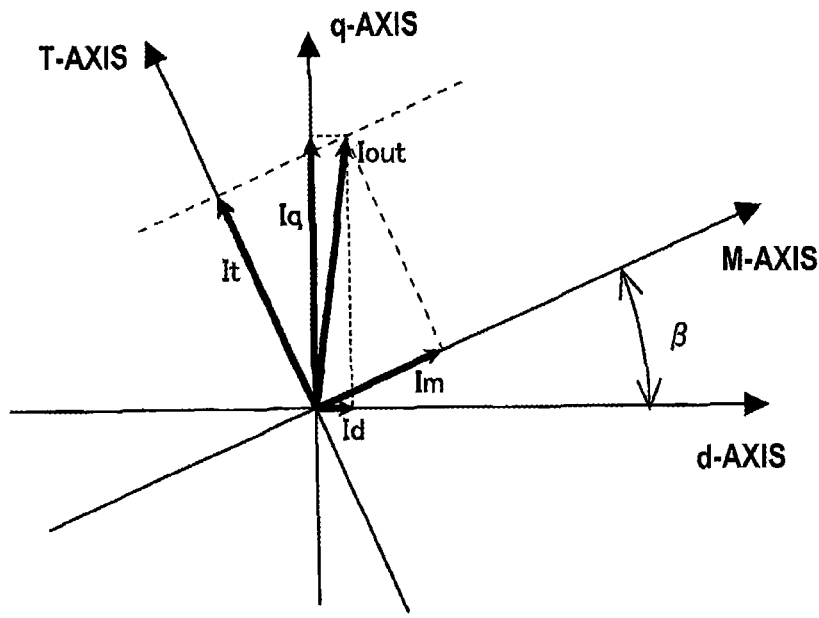
FIG. 8A is a diagram showing a relationship between current vectors Iout, Iq, It, Im when Id>0.
Figure 8B:
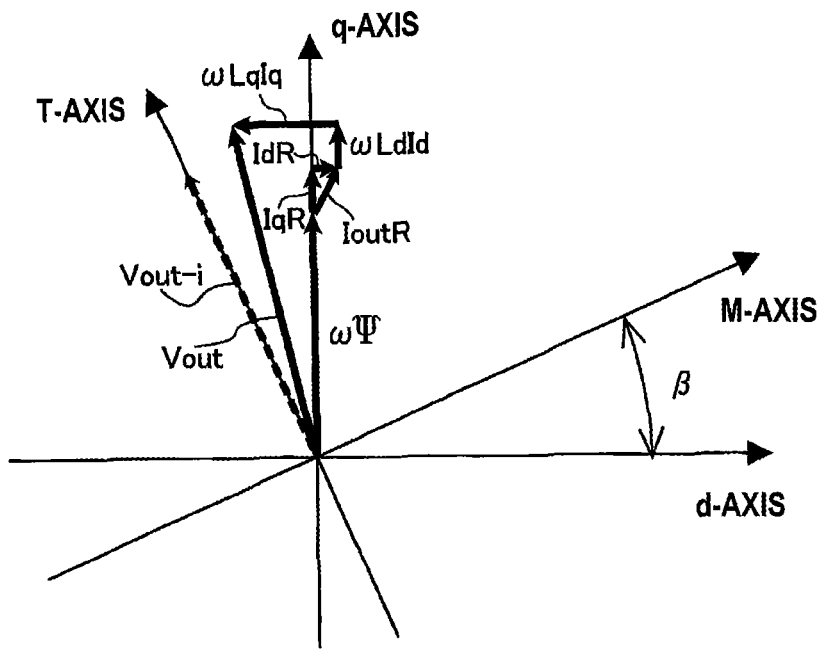
FIG. 8B is a diagram showing a voltage vector Vout corresponding to the current vector Iout shown in FIG. 8A.

FIG. 8A shows a relationship between Iout, Iq, Id, It, and Im in a case where a phase lag of the output current Iout occurs with respect to the current Iq, i.e., when Id>0. Under a condition that the torque current It is controlled at the same magnitude as that of FIG. 6A based on the torque-current command value It*, Iq is larger than that in the ideal state shown in FIG. 6A. The vector of the corresponding voltage Vout is as shown in FIG. 8B. Since Id is larger than zero, i.e., Id>0, IdR is a rightward vector, and ωLdId is an upward vector. Because of the presence of these vectors and also because of the larger Iq, the output voltage Vout is larger than the ideal output voltage Vout-i shown by dotted line (see FIG. 6B). At this time, the current Im on the M-axis is larger than the current Im in the ideal state shown in FIG. 6A.

The followings can be seen from FIGS. 6A through 8B regarding the magnetization current Im. When an actual output voltage Vout is smaller than an ideal output voltage Vout-i, the magnetization current Im is increased to cause the phase lag of the output current Iout, so that the output voltage Vout can approach the ideal output voltage Vout-i. In contrast, when an actual output voltage Vout is larger than an ideal output voltage Vout-i, the magnetization current Im is decreased to cause the phase lead of the output current Iout, so that the output voltage Vout can approach the ideal output voltage Vout-i. In this manner, the magnetization-current command value Im* can be determined by determining a target output voltage for a particular operating state, and determining the deviation between the target output voltage and an actual output voltage.

In the above-described SPM motor, a magnetic flux generated by a winding of a motor stator receives a uniform magnetoresistance of a permanent magnet. Accordingly, the d-axis inductance Ld is equal to the q-axis inductance Lq. In a case of an IPM (Interior Permanent Magnet) motor, a magnetic flux in the d-axis direction receives a magnetoresistance of a permanent magnet, while a magnetic flux in the q-axis direction passes through only an iron core. Therefore, a difference exists between the d-axis inductance Ld and the q-axis inductance Lq. Accordingly, the highest driving efficiency is achieved when the output current Iout has a certain degree of phase lead from the q-axis.

However, the relationships shown in FIGS. 7A through 8B hold true also for an IPM motor. Thus, increasing Im will result in an increase in Vout with respect to the ideal output voltage Vout-i, and decreasing Im will result in a decrease in Vout. Therefore, also in an IPM motor, the magnetization-current command value Im* can be determined by determining a target output voltage for a particular operating state, and determining the deviation between the target output voltage and an actual output voltage.

In a case of an induction motor, unlike a synchronous motor, it is necessary to supply a large amount of magnetization current Id in order to generate a magnetic flux, and an inductive power E is generated in the d-axis which is perpendicular to the magnetic flux generated. However, the relationships shown in FIGS. 7A through 8B hold true also for the induction motor. Thus, increasing Im will result in an increase in Vout with respect to the ideal output voltage Vout-i, and decreasing Im will result in a decrease in Vout. Therefore, the magnetization-current command value Im* can be determined by determining a target output voltage for a particular operating state, and determining the deviation between the target output voltage and an actual output voltage.

Figure 9:
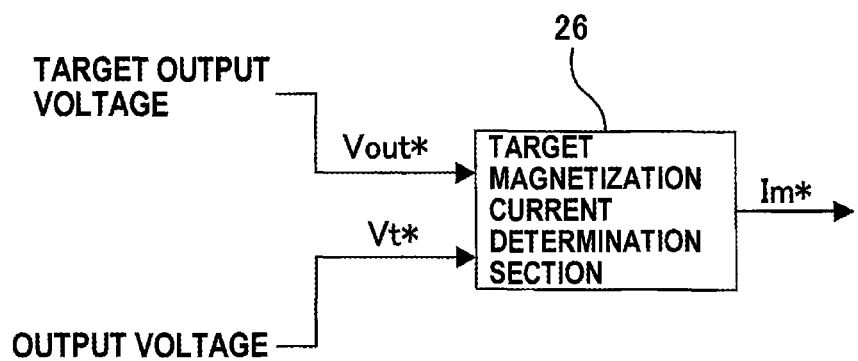
FIG. 9 is a diagram showing a control block which determines a magnetization-current command value Im* which is a target value of magnetization current Im.

FIG. 9 shows a control block which determines the magnetization-current command value Im* which is a target value of the magnetization current Im. As shown in FIG. 9, the magnetization-current command value Im* is determined by inputting the target-output-voltage value Vout* and the present output voltage Vout into the target-magnetization-current determination section 26. The present output voltage Vout can be obtained by combining signals of voltage command values Vm*, Vt* on the MT-axes which are obtained as a result of the vector control.

$$Vout = \sqrt{Vm^{*2} + Vt^{*2}}$$

In this embodiment, a command voltage is determined using the T-axis as a reference axis. The T-axis is one of the MT-axes which are inverter axes. In this embodiment, 0 is inputted as Vm* into the rotational-to-stationary coordinate transformation section 35. Therefore, the inverter output voltage is located on the T-axis: Vout=Vt*. When Vt*>Vout*, the target-magnetization-current determination section 26 outputs a larger magnetization-current command value Im* so as to cause the phase lag of the output current Iout, whereas when Vt*<Vout*, the target-magnetization-current determination section 26 outputs a smaller magnetization-current command value Im* so as to cause the phase lead of the output current Iout.

As shown in FIG. 1, the torque-current command value It* is inputted into the torque-voltage control section 21. As described above, the torque-voltage control section 21 calculates the torque-voltage command value Vt* based on the deviation between the present torque current It and the torque-current command value It*. As described above, the magnetization-voltage command value Vm* to be inputted is 0. In this manner, the vector control can be performed using T-axis vectors on the MT-axes which are the inverter axes.

The target output voltage Vout* is calculated using the equation (8) as follows.

$$V\text{out}^* = \sqrt{(-\omega Lq \sqrt{\text{Im}^2 + It^2})^2 + (\sqrt{\text{Im}^2 + It^2} \cdot R + \omega \Psi)^2} \qquad (9)$$

The target-output-voltage determination section 27 determines the target output voltage Vout*, using the equation (9), based on the torque current It, the magnetization current Im, the angular velocity ω of the rotor, and the motor constants (i.e., the winding resistance R, the q-axis inductance Lq, and the magnetic flux Ψ).

The torque current It, the magnetization current Im, and the motor constants are inputted into the target-output-voltage determination section 27, which determines the target output voltage Vout* using these parameters and the above-described equation (9). Specifically, as shown in FIG. 1, the torque current It and the magnetization current Im are inputted from the stationary-to-rotational coordinate transformation 18 into the target-output-voltage determination section 27, and the angular velocity ω is inputted from the velocity calculator 31 into the target-output-voltage determination section 27. The motor constants (i.e., the winding resistance R, the q-axis inductance Lq, and the magnetic flux Ψ) are inputted in advance from the outside of the vector controller 11 into the target-output-voltage determination section 27, and are stored in the target-output-voltage determination section 27.

Once a motor, to be driven, is identified, the motor constants can be obtained in advance. The motor constants can be obtained using known techniques. For example, the winding resistance R and the q-axis inductance Lq can be measured by a measuring device, such as LCR meter. The magnetic flux Ψ may be calculated from a design value inherent in the motor or a measured value of an induced voltage of the motor, or may be measured by a measuring device, such as gauss meter.

The current Iout supplied to the motor M is expressed as follows.

$$I\text{out} = \sqrt{\text{Im}^2 + It^2} \qquad (10)$$

Therefore, the following equation is derived from the equations (9) and (10).

$$V\text{out}^* = \sqrt{(-\omega Lq \cdot I\text{out})^2 + (I\text{out} \cdot R + \omega \Psi)^2} \qquad (11)$$

The current Iout varies depending on a load on the motor M. As can be seen from the equation (11), the target output voltage Vout* varies in response to a change in the load on the motor M. Therefore, the motor efficiency is improved, and loss of synchronism of the motor can be prevented.

Figure 10A:
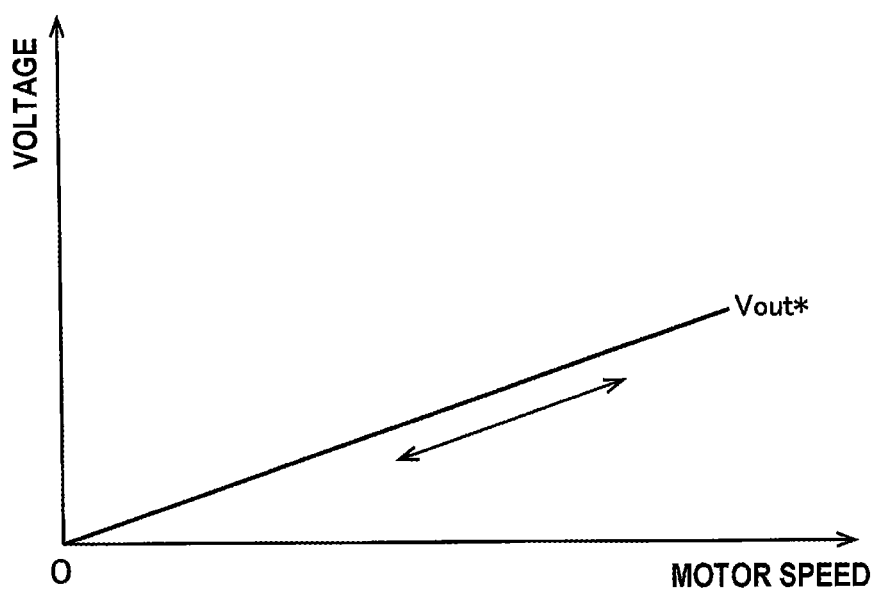
FIG. 10A is a graph showing a target output voltage which is determined in accordance with a conventional vector control.
Figure 10B:
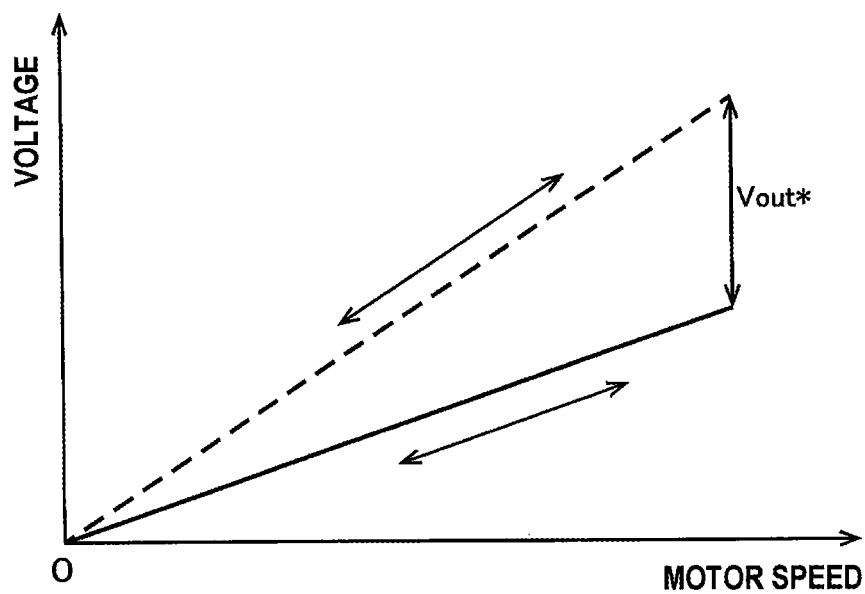
FIG. 10B is a graph showing a target output voltage which is determined in accordance with a vector control in the embodiment.

FIG. 10A is a graph showing the target output voltage Vout* which varies in response to a change in the rotational speed (i.e., rotational frequency) of the motor M in a conventional vector control. FIG. 10B is a graph showing the target output voltage Vout* which varies in response to the magnitude of the load on the motor M in the vector control according to the embodiment. In FIG. 10A and FIG. 10B, horizontal axis represents the rotational speed (or rotational frequency) of the motor M, and vertical axis represents the output voltage generated by the inverter 10, i.e., the voltage to be applied to the motor.

Conventionally, as shown in FIG. 10A, a maximum value of the target output voltage Vout* is a fixed value. The voltage, to be applied to the motor, varies only in accordance with the rotational speed of the motor M. In a case of such motor control, when the load is small, the motor M is controlled with the voltage, to be applied to the motor, which is higher than necessary. As a result, the operating efficiency of the motor M is lowered. Further, when the load on the motor M is large, the rotor of the motor can lose synchronism.

In this embodiment, as shown in FIG. 10B, the voltage to be applied to the motor varies in accordance with not only the rotational speed of the motor M, but also the load on the motor M. As a result, the efficient and stable motor control can be effected.

Field-weakening control may be performed in the driving apparatus of this embodiment. Specifically, after the output voltage of the inverter 10 has reached a rated voltage of the motor M, in order to limit (keep) the target output voltage Vout* at not more than the rated voltage, it is preferred to adjust for maintaining the magnetization-current command value Im*. This operation can increase the rotational speed of the motor M while maintaining the output voltage of the inverter 10. Further, after the target output voltage Vout* has reached an upper limit of the output voltage of the inverter 10 calculated from a DC link voltage of the inverter 10, i.e., an upper limit of the voltage to be applied to the motor, in order to limit (keep) the target output voltage Vout* at not more than the upper limit of the output voltage of the inverter 10, it is preferred to adjust for maintaining the magnetization-current command value Im*. By keeping the target output voltage Vout* at not more than the upper limit of the output voltage of the inverter 10, the rotational speed of the motor M can be increased. Further, after the target output voltage Vout* has first reached one of the rated voltage of the motor M and the upper limit of the output voltage of the inverter 10, it is more preferred to keep the target output voltage Vout* at either the rated voltage of the motor M or the upper limit of the output voltage of the inverter 10, whichever the target output voltage Vout* reaches first.

Figure 11:
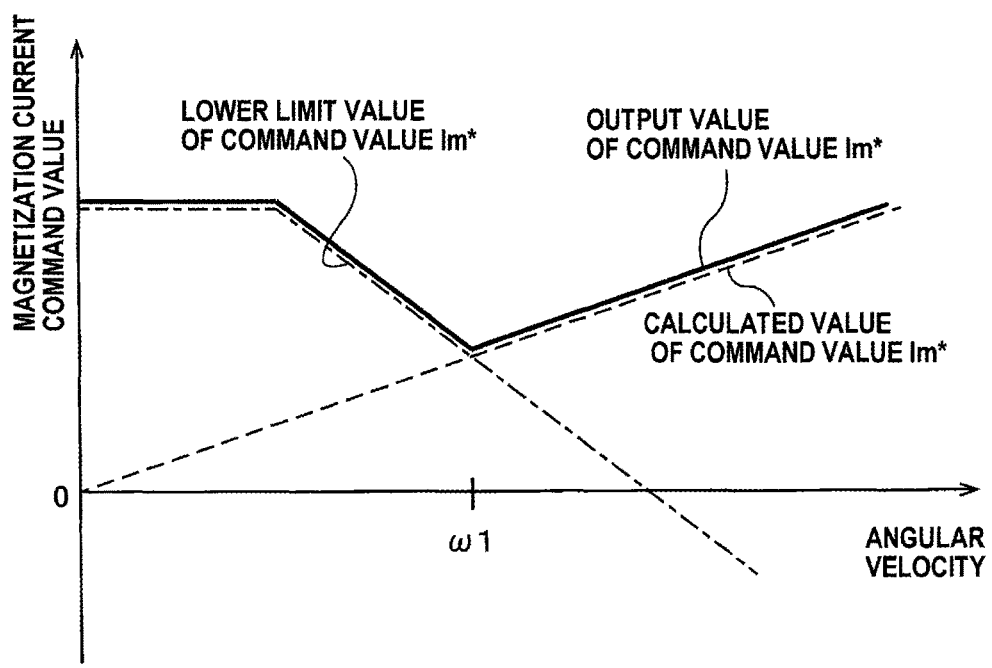
FIG. 11 is a diagram illustrating an example in which a magnetization-current command value in a low-frequency range is boosted.
Figure 12:
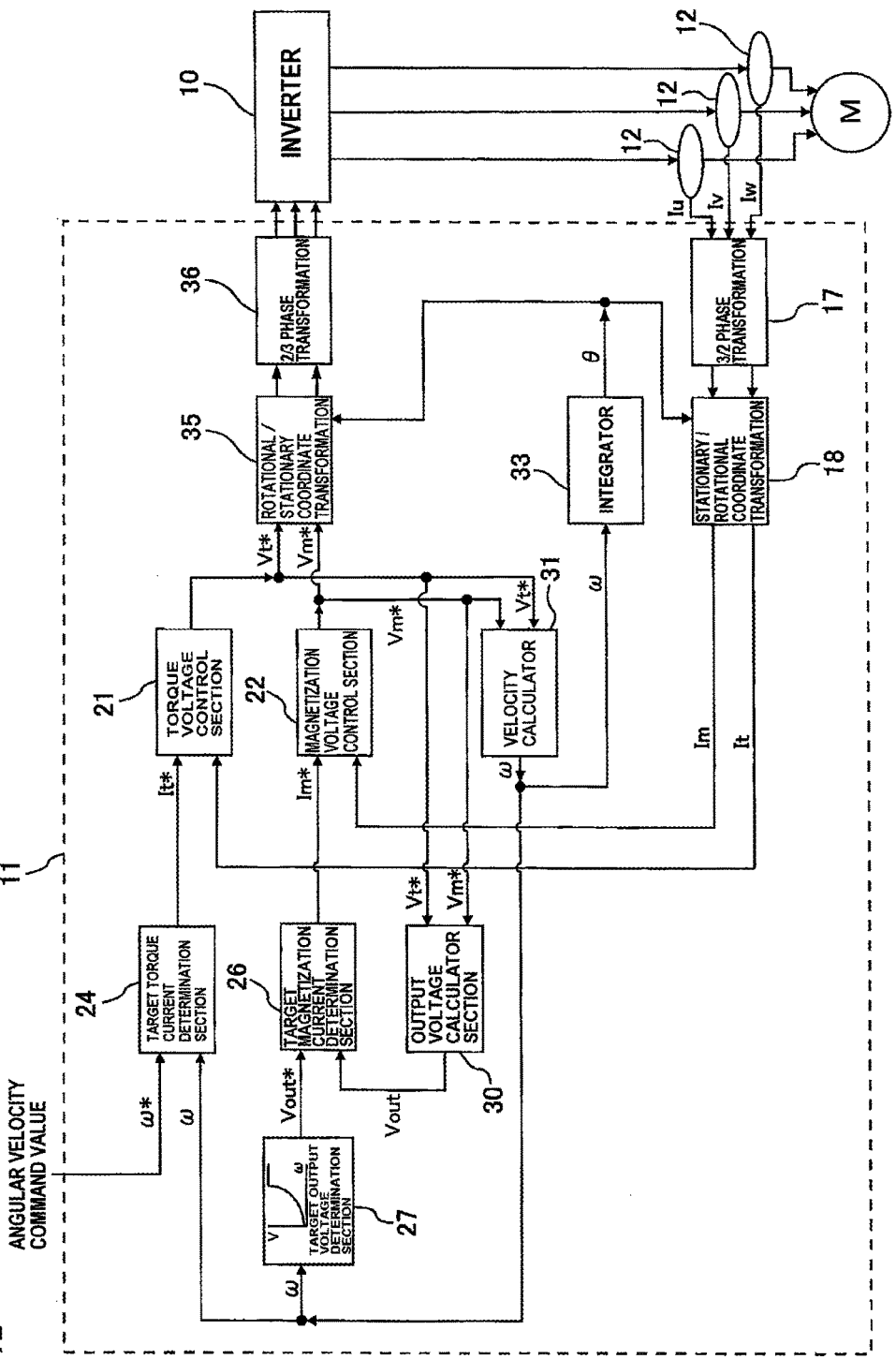
FIG. 12 is a control block diagram illustrating a conventional sensorless vector control.

It is possible in this embodiment to boost the torque in a low-frequency range. In general, the output current of the inverter 10 is low in a low-motor frequency (rotational speed) range, and therefore it is difficult to control the motor. In view of this, as shown in FIG. 11, it is preferred to set a lower limit of the magnetization-current command value Im*, shown by dashed-dotted line, in a range in which the angular velocity of the motor M is equal to or lower than a predetermined value, and to boost the magnetization-current command value Im* in this low-frequency range. In the example shown in FIG. 11, when the angular velocity of the rotor of the motor M is not more than ω1, the target-magnetization-current determination section 26 outputs a pre-stored lower limit value as the magnetization-current command value Im* shown by solid line. When the angular velocity is more than ω1, on the other hand, the target-magnetization-current determination section 26 calculates a magnetization-current command value Im* which is shown by dotted line and obtained by the PI control, and outputs the resultant value as the magnetization-current command value Im* shown by solid line. In this manner, the torque boost in the low-motor speed range can be effected by thus compensating for the magnetization-current command value Im* in the low-frequency range. In FIG. 11, the line graph indicating the lower limit value of the magnetization-current command value Im* is inclined. This is because a high command value Im* may lead to over-excitation and low efficiency. In order to avoid such over-excitation and to perform quick control with an appropriate command value, the lower limit value of the magnetization-current command value Im* is decreased in accordance with an increase in the angular velocity, thereby making the command value Im* small.

A lower limit value may be provided on the target output voltage Vout*, instead of the magnetization-current command value Im*. In that case, when the angular velocity is equal to or lower than a predetermined value, the target-output-voltage determination section 27 outputs a pre-stored lower limit value as the target output voltage Vout*. On the other hand, when the angular velocity is higher than the predetermined value, the target-output-voltage determination section 27 outputs the target output voltage Vout* which is calculated by the target-output-voltage determination section 27. Also in this case, as with the example shown in FIG. 11, the lower limit value of the target output voltage Vout* is decreased in accordance with an increase in the angular velocity.

The above-described torque boost in the low-frequency range may be performed with selected one of the magnetization-current command value Im* and the target output voltage Vout*. More specifically, the above-discussed lower limit value may be provided on both the magnetization-current command value Im* and the target output voltage Vout*, and either the lower limit value of the magnetization-current command value Im* or the lower limit value of the target output voltage Vout* may selectively be outputted from the target-magnetization-current determination section 26 or the target-output-voltage determination section 27.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a driving apparatus which performs vector control based on an inverter output current.

REFERENCE SIGNS LIST 10 inverter
11 vector controller
12 current detector
17 three-to-two phase transformation section
18 stationary-to-rotational coordinate transformation section
21 torque-voltage control section
22 magnetization-voltage control section
23 magnetization-voltage output section
24 target-torque-current determination section
26 target-magnetization-current determination section
27 target-output-voltage determination section
30 output voltage calculator
31 velocity calculator
33 integrator
35 rotational-to-stationary coordinate transformation section
36 two-to-three phase transformation section

What is claimed is:
1. A driving apparatus for an electric motor, comprising:
an inverter;
a current detector configured to detect an output current of the inverter; and
a vector controller configured to transform the output current, detected by the current detector, into a torque current and a magnetization current, and to control the torque current and the magnetization current,
wherein the vector controller comprises:
a three-to-two phase transformation section configured to transform three-phase currents, detected by the current detector, into two-phase currents;
a stationary-to-rotational coordinate transformation section configured to transform the two-phase currents on a stationary coordinate system, which have been transformed by the three-to-two phase transformation section, into a torque current and a magnetization current on a rotating coordinate system;
a torque-voltage control section configured to determine a torque-voltage command value based on a deviation between a torque-current command value and the torque current;
a magnetization-voltage output section configured to output 0 as a magnetization-voltage command value;
a rotational-to-stationary coordinate transformation section configured to transform the torque-voltage command value and the magnetization-voltage command value on a rotating coordinate system into a torque-voltage command value and a magnetization-voltage command value on a stationary coordinate system;
a two-to-three phase transformation section configured to transform the torque-voltage command value and the magnetization-voltage command value, which have been transformed by the rotational-to-stationary coordinate transformation section, into three-phase voltage command values;
a velocity calculator configured to calculate an angular velocity of a rotor of the electric motor from the magnetization current, a magnetization-current command value, and the torque-voltage command value;
a target-torque-current determination section configured to determine the torque-current command value based on a deviation between the angular velocity and an angular-velocity command value;
a target-output-voltage determination section configured to determine a target output voltage from the torque current, the magnetization current, the angular velocity of the rotor, and motor constants; and a target-magnetization-current determination section configured to determine the magnetization-current command value based on a deviation between the torque-voltage command value and the target output voltage.

2. The driving apparatus according to claim 1, wherein the motor constants are a magnetic flux of the electric motor, a winding resistance of the electric motor, and an inductance in a q-axis direction which is perpendicular to the magnetic flux generated by a permanent magnet of the rotor.

3. The driving apparatus according to claim 1, wherein the magnetization-current command value is adjusted so as to keep the target output voltage at a rated voltage of the motor after an output voltage, generated by the inverter, has reached the rated voltage of the motor.

4. The driving apparatus according to claim 1, wherein the magnetization-current command value is adjusted so as to keep the target output voltage at not more than an upper limit of an output voltage of the inverter, after the target output voltage has reached the upper limit of the output voltage generated by the inverter.

5. The driving apparatus according to claim 1, wherein the target output voltage is kept at one of a rated voltage of the motor and an upper limit of an output voltage generated by the inverter, whichever the target output voltage reaches first, after the target output voltage has reached either the rated voltage of the motor or the upper limit of the output voltage generated by the inverter.

6. A driving apparatus for an electric motor, comprising:
an inverter;
a current detector configured to detect an output current of the inverter; and
a vector controller configured to transform the output current, detected by the current detector, into a torque current and a magnetization current and to control the torque current and the magnetization current,
wherein the vector controller comprises:
a torque-voltage control section configured to determine a torque-voltage command value based on a deviation between a torque-current command value and the torque current;
a target-output-voltage determination section configured to determine a target output voltage from the torque current, the magnetization current, an angular velocity of the rotor of the electric motor, and motor constants; and
a target-magnetization-current determination section configured to determine a magnetization-current command value based on a deviation between the torque-voltage command value and the target output voltage.

* * * * *

UNITED STATES PATENT AND TRADEMARK OFFICE
CERTIFICATE OF CORRECTION

PATENT NO. : 9,780,713 B2  Page 1 of 1
APPLICATION NO. : 15/123488
DATED : October 3, 2017
INVENTOR(S) : Kenta Tsukakoshi et al.

It is certified that error appears in the above-identified patent and that said Letters Patent is hereby corrected as shown below:

In the Specification

Column 4, Line 27, "velocity co" should read -- velocity $\omega$ --

Column 7, Line 42, "direction, co" should read -- direction, $\omega$ --

Column 7, Line 60, "velocity co" should read -- velocity $\omega$ --

Column 8, Line 26, "velocity co" should read -- velocity $\omega$ --

Signed and Sealed this
Twentieth Day of March, 2018

Andrei Iancu
*Director of the United States Patent and Trademark Office*